May 3, 1938.    R. H. WHITEHEAD    2,116,256
SELF STARTING MOTOR FOR ELECTRIC CLOCKS AND THE
LIKE AND PROCESS OF MAKING THE SAME
Filed Oct. 9, 1935
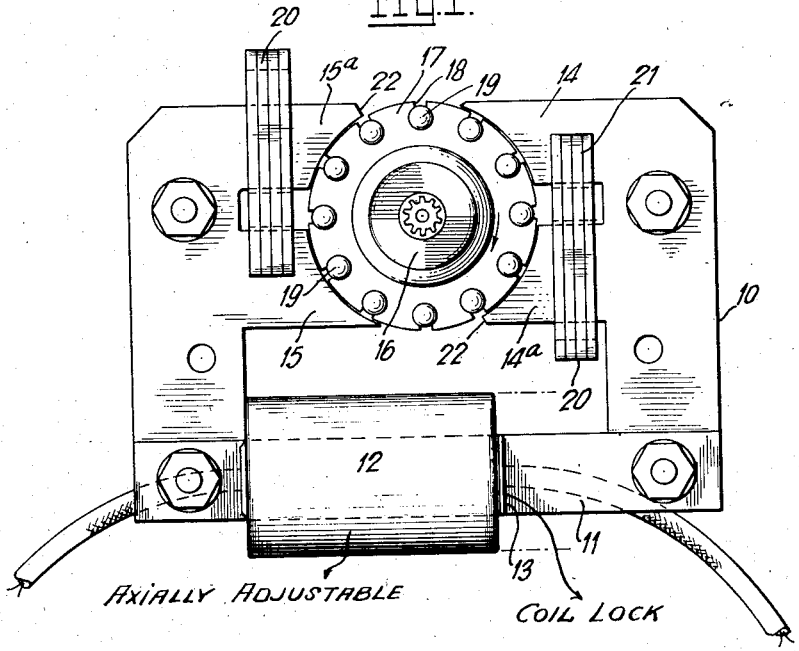
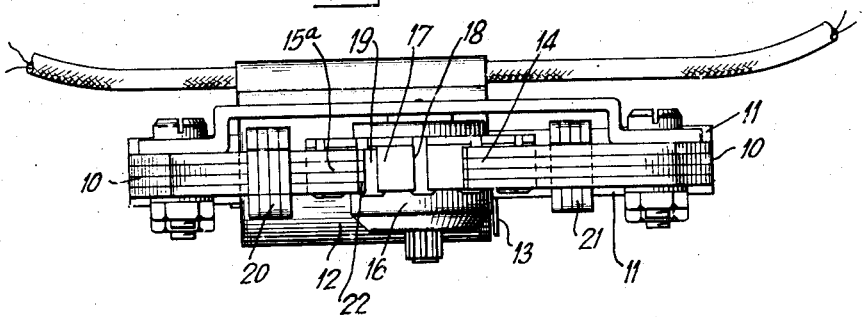
INVENTOR
Richard H. Whitehead
BY
ATTORNEY Patented May 3, 1938

2,116,256

UNITED STATES PATENT OFFICE 2,116,256

SELF-STARTING MOTOR FOR ELECTRIC CLOCKS AND THE LIKE AND PROCESS OF MAKING THE SAME

Richard H. Whitehead, New Haven, Conn., assignor to The New Haven Clock Company, New Haven, Conn., a corporation of Connecticut Application October 9, 1935, Serial No. 44,196

5 Claims. (Cl. 172—278)

This invention relates to self starting motors for electric clocks and the like and to process of making the same.

It is an object of this invention to provide a motor which will start from rest on the application of current and which will readily fall into synchronism and maintain its synchronism throughout the wide range of current conditions.

It is a further object to provide a motor which may be manufactured with a wide tolerance and which may be assembled inexpensively and which, nevertheless, may be caused to operate reliably and invariably.

It is a further object to provide a motor of the character described which will have a large amount of torque in proportion to the power consumption.

Other objects of the invention will in part be obvious and will in part appear hereinafter.

In the manufacture of small electric motors for clocks and the like, attempts have been made to compute mathematically the operating and electric factors and to design motors accordingly. Such efforts, however, have not been very satisfactory because many of the factors involved are too small for accurate measurement, and commercial variations in the constructional parts are impossible to estimate. The inaccuracy of the assumptions destroy the value of the computations.

It has heretofore been suggested that these small synchronous motors shall be constructed in the general form of a shading coil, revolving field, stator and a squirrel cage armature so arranged that the localized poles of the squirrel cage are so sharply defined and so disposed relative to the edges of the pole pieces upon the stator as to cause a locking in effect at synchronous speed which maintains the synchronous speed accurately.

Such a motor has two definite and different speeds, one being the net effect of the shifting of the field from the unshaded to the shaded pole by the shading coil, resembling the effect of a rotating field. This has a definite effect upon the squirrel cage armature acting as an induction motor. This speed may be called, by analogy, the rotating field synchronous speed. The other speed depends upon the fact that while the stator is magnetized the edge of a pole piece upon the rotor passes with difficulty out from under the pole piece, but that it will pass out from under the pole piece freely during the periods of zero current. This effect, therefore, has a synchronous speed, such that one tooth upon the rotor passes out from under the field piece with each alternation of the current and is locked from passing out at any other speed. This speed which corresponds to the passing out of one tooth for each alternation may be called the locking synchronous speed. This locking effect offers considerable opposition to the starting of the rotor from rest and considerable opposition to this movement at any speed above or below the locking synchronous speed.

The induction motor torque of the rotor is, however, a function of the speed reaching a maximum very much below the rotating field synchronous speed and falling off to zero at that synchronous speed.

In the starting of such a motor, therefore, we have two counteracting forces, the one the locking effect opposing rotation until the locking synchronous speed is reached, and the other the induction motor effect which must be sufficient to overcome the locking in effect until the locking synchronous speed is reached and then must be insufficient to carry it beyond the locking in synchronous speed.

It has been proposed, therefore, to secure the proper adjustment between the two contending forces by adjusting the speed of the revolving field so that it is only slightly greater than that of the locking synchronous speed, relying on the fact that the torque of the induction motor effect is falling off most rapidly as it approaches the revolving field synchronous speed. This plan has not proven very successful, however, because motors built upon this principle have proven unduly responsive to change of conditions and to voltage changes. The balance between the two forces is so delicate that when motors are made in quantity production, some of them fail to attain synchronous speed and some of them will overrun.

In accordance with this invention, I have discovered that the cause of the irregularity in the performance of motors made from standard parts by quantity production methods is due to slight irregularities in the constants which cannot be wholly avoided unless at the expense of undue cost.

I have further found, however, that these irregularities can be compensated for in a practical and commercial manner by making provision for the adjustment of the magnetic constants of the motor after assemblage, so that the lack of balance produced by the variations of construction under commercial conditions is restored by the adjustment.

In order to obtain the maximum starting effect and at the same time the greatest reliability in the synchronous running, I have found it desirable to make the revolving field synchronous speed considerably higher than that of the locking in synchronous speed and at the same time to provide adjustment of the magnetic factors which produce the locking in effect, which the induction torque is required to overcome.

The invention accordingly comprises the several steps and relation and order of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description, taken in connection with the accompanying drawing, in which:

Figure 1 is an elevation of a motor involving this invention.

Figure 2 is a top plan view of the same.

In the drawing, the numeral 10 designates a substantially U shaped laminated field structure having a central core section 11 on which is mounted a magnetic coil 12. This coil is preferably made of less length than the core section 11 and it is provided with a locking device 13 whereby it may be adjusted to different positions upon the core 11 and when so adjusted may be locked in place. This field structure has its ends terminating in pole pieces, as for example 14, 14—a, 15 and 15—a, defining between them a circular opening to receive a squirrel cage rotor 16 having its periphery divided into sections 17 by slots 18 at each of the cross bars 19 of the squirrel cage.

One pole piece of each pair, as for example, the pole pieces 14—a and 15—a is surrounded by a shading coil 20 which is preferably in a form firmly to hold the lamina of the pole piece together and at the same time each shading coil is provided with a rearwardly extending fork 21 adapted to embrace but not surround the lamina of the pole pieces 14 and 15 respectively, thereby steadying the lamina of the free pole pieces and at the same time bracing the shading coils.

The stator pole pieces are of a width equal to two or more of the sections of the rotor and the two unshaded pole pieces are ranged to be in registry with sections of the rotor substantially simultaneously. Similarly the two shaded pole pieces are in registry with sections of the rotor simultaneously but only after the rotor has moved a fraction of a rotor section after the unshaded coils are in registry.

When the motors are constructed in accordance with the foregoing description, it would be found that a variation of the position of the coil 12 will materially affect the operations of the motor and when that coil is placed in any standardized position, some of the motors will not operate satisfactorily. I have found, however, that by adjustment of the coil 12 during the testing operation, a position of the coil can be found for every motor at which it will attain synchronous speed and maintain that speed notwithstanding all commercial fluctuations of voltage.

In this manner, the entire production of the factory may be utilized with security that satisfactory operations will result in all cases.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process of making a small single phase self starting synchronous motor which comprises constructing a motor having superposed an induction starting field and a locking in synchronous field and then adjusting the distribution of the flux between the various poles of the said motor to secure a proper balance between the starting flux and the locking in flux.

2. A process of making a small single phase self starting synchronous motor which comprises constructing a motor having superposed an induction starting field and a locking in synchronous field having a coil movable on its core, and then adjusting the distribution of the flux between the various poles of the said motor to secure a proper balance between the starting flux and the locking in flux by shifting the coil to affect the poles unequally until stable synchronous running is attained.

3. A process of making a single phase induction motor which comprises forming a U shaped field member having its legs divided into a shaded and an unshaded pole placing a coil upon said field member, inserting within the field defined by said poles a rotor having an induction starting effect and a locking in synchronous effect within said field and then adjusting the relative value of said starting and synchronous effects by varying the position of the coil upon the field member to affect the poles unequally until stable synchronous running is attained.

4. A single phase motor for clocks and the like comprising in combination a plurality of stator poles, shading coils upon certain of said poles to produce a rotating field, a rotor within said field having magnetic sections of a width equal to an integral fraction of the width of each pole piece, and spaced to be in registry with the unshaded pole pieces simultaneously, a core piece connecting said pole pieces and a magnetizing coil movable upon said core to alter the magnetic constants of the motor and means for retaining said coil in any particular adjusted position.

5. The process of adjusting the synchronous and induction fields of a single phase self starting induction motor which comprises shifting the coil along its core to affect the poles unequally until stable synchronous running is obtained.

RICHARD H. WHITEHEAD.